William J. Sloughter
INVENTOR.

BY Richard E. Bee
ATTORNEY

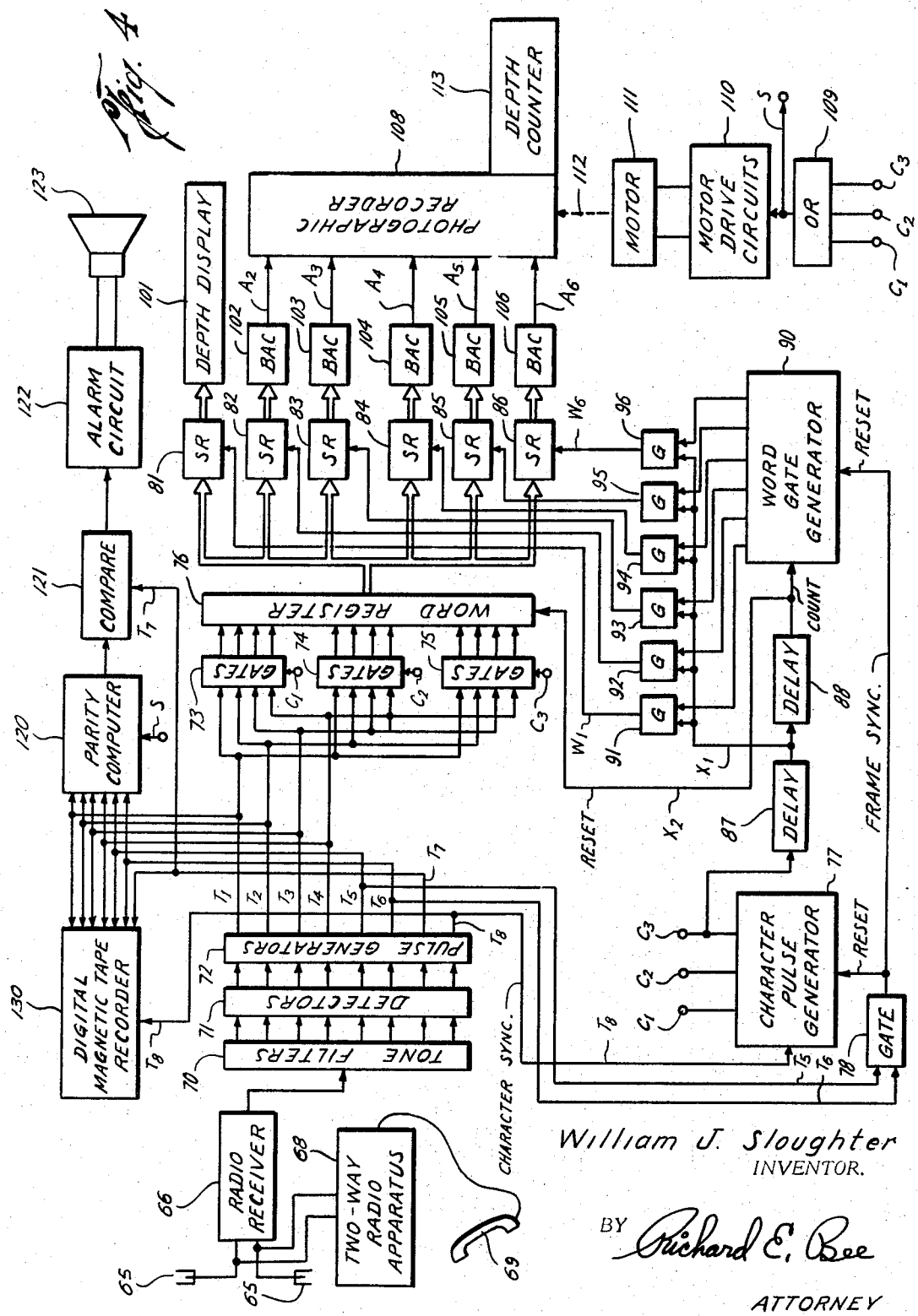

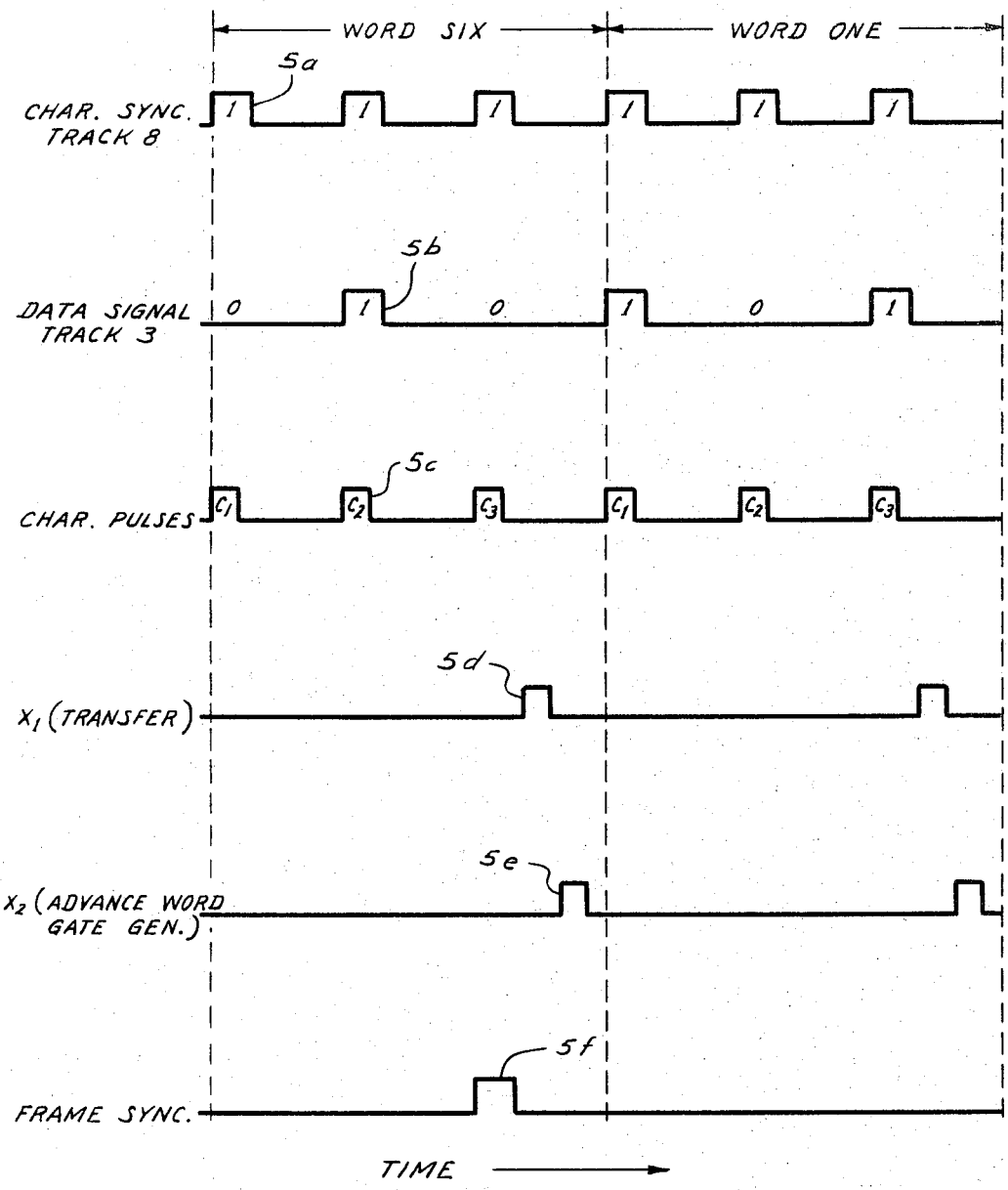

# United States Patent Office 3,356,990
Patented Dec. 5, 1967

3,356,990
WELL LOGGING TELEMETRY SYSTEM INCLUDING DEPTH SYNCHRONIZING A REMOTE RECORDER AND ERROR DETECTION OF THE TRANSMITTED DATA
William J. Sloughter, Houston, Tex., assignor, by mesne assignments, to Schlumberger Technology Corporation, Houston, Tex., a corporation of Texas
Filed Sept. 23, 1965, Ser. No. 489,643
11 Claims. (Cl. 340—18)

ABSTRACT OF THE DISCLOSURE

This disclosure describes telemetry apparatus for transmitting well logging measurements from a plurality of measurement apparatus in digital form from a remote well site to a central location, and receiving apparatus at the central location for receiving and decoding the transmitted data. More particularly, the transmitting apparatus encodes the analog well logging measurements from the different well logging apparatus into a digital form suitable for transmission, on a time sharing basis. This encoding operation is controlled by depth signals representative of the movement of the downhole investigating apparatus through the borehole. Along with the well logging data, there is transmitted suitable parity and depth synchronization data. On the receiving end, the transmitted information is decoded into analog representation of the original well logging measurements on a time sharing basis. The received well logging data is depth synchronized with the transmitted data in response to the transmitted synchronization data. Provision is also made for transmitting and receiving numerical indications of the actual depth of the downhole investigating apparatus.

---

This invention relates to telemetry systems and, particularly, to telemetry systems for use with well logging apparatus.

In the well logging art, a logging sonde containing various types of exploring devices is lowered into a borehole drilled into the earth for measuring various properties of the subsurface earth formations adjacent the borehole. Such measurements are of considerable value in determining the presence and depth of hydrocarbon-bearing zones (oil, gas, etc.) that may exist in the subsurface earth formations. The various measurement signals from the downhole sonde are recorded by a multi-channel recorder located at the surface of the earth. The resulting record, known as a "log," is then examined by various geologists and geophysical experts to determine the nature of the subsurface formations and whether or not any oil or gas may be present and, if so, in what quantity and so forth.

Heretofore it has been necessary that the geologist or other geophysical expert be at the well site in order to evaluate the log or else the log must be transported to some central office location at which the expert may be present. In the first case, a large number of experts are required. In the second case, too much time is expended in delivering the log to the expert and relaying his conclusions and instructions back to the well site. These problems are particularly troublesome in the case of off-shore drilling platforms because in this case transportation can be rather slow and sometimes difficult, particularly under adverse weather conditions.

It is an object of the invention, therefore, to provide a new and improved system whereby a well log can be recorded at a central office location simultaneously with the making of well logging measurements at a remote well site location.

It is another object of the invention to provide a new and improved telemetry system for transmitting well logging measurments from a remote well site location to a central office location or other more centrally convenient location.

In accordance with the invention, the well logging measurements at the remote well site are converted into digital pulse code signals in a repetitive sequential manner. This converting is performed in step with the physical movement of the logging sonde through the borehole. The pulse code signals are then applied sequentially to a set of tone oscillators which generate correspondingly coded audio frequency tones. These coded audio tones are then transmitted by way of a radio transmitter, telephone lines, or the like to the desired central office location.

At the central office location, the received audio tones are separated and detected to reproduce the pulses constituting the pulse code signals. These signals are then segregated according to the different measurements involved and the signals for each of the measurements are individually converted into corresponding analog signals. These analog signals are then supplied to a multi-channel recorded located at the central office. This recorder is driven or advanced in synchronism with the actual movement of the logging sonde through the borehole. This may be done by generating at the well site a synchronizing signal which is indicative of the sonde movement. This signal is then transmitted as another of the audio tones. After detection at the receiver, it is used to drive the central office recorder.

Alternatively, the depth signals for driving the central office recorder may be obtained from the pulse code modulated signals themselves. This is possible because the various code groups comprising the pulse code signals are generated in synchronism with the movement of the sonde through the borehole.

For a better understanding of the present invention, together with other and further objects and features thereof, reference is had to the following description taken in connection with the accompanying drawings, the scope of the invention being pointed out in the appended claims.

Referring to the drawings:

FIG. 4 is a block diagram of a representative embodiment of the central office portion of a well logging telemetry system constructed in accordance with the present invention; and FIG. 5 is a timing diagram describing signal waveforms present at different points in the FIG. 4 portion of the system.

Figure 1:
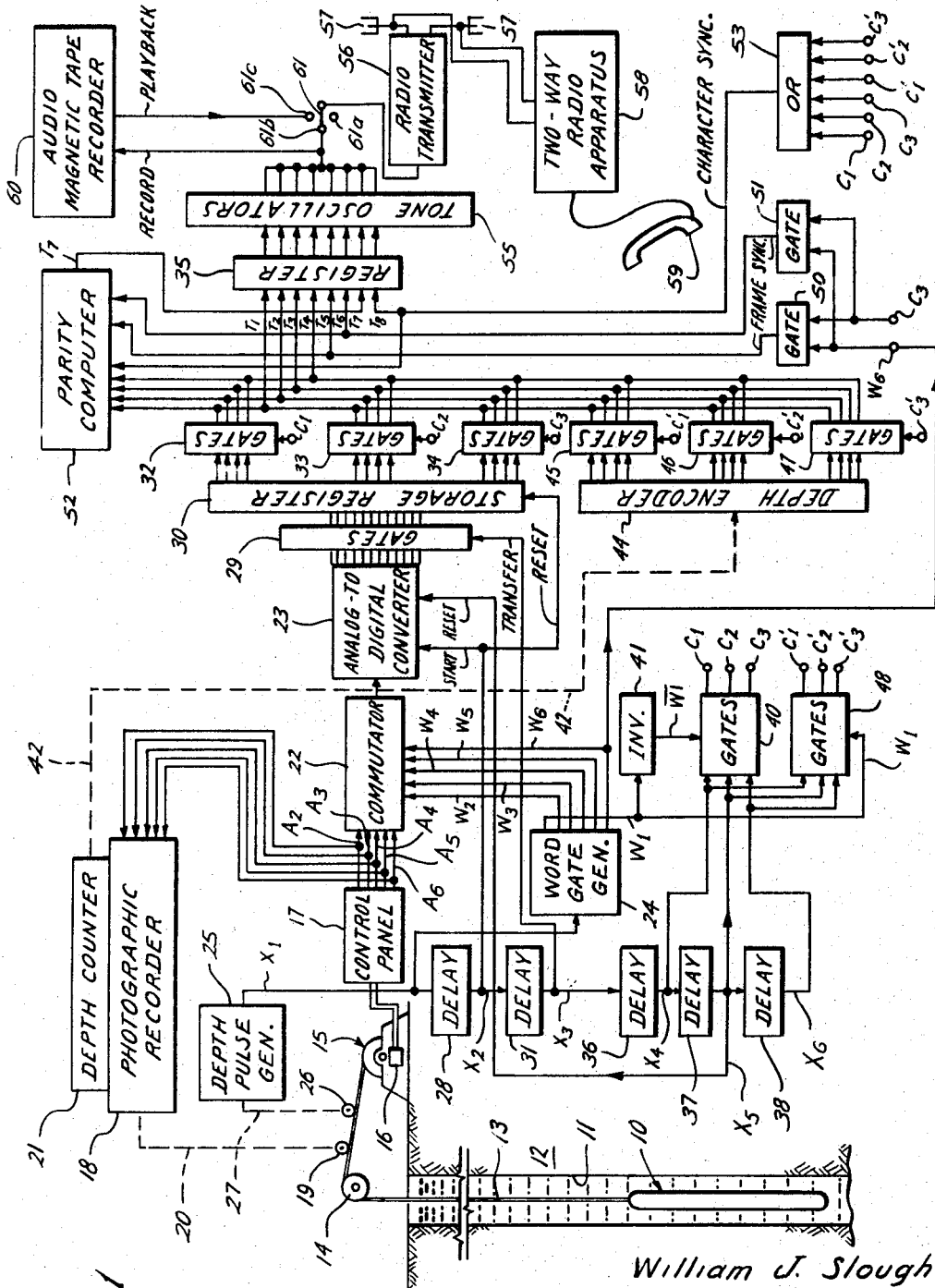
FIG. 1 is a block diagram of a representative embodiment of the well site portion of a well logging telemetry system constructed in accordance with the present invention.

Referring to FIGURE 1 of the drawings, there is shown the portion of the system which is located at the well site. This includes both the well logging apparatus for making the borehole measurements and the transmitting apparatus for transmitting these measurements to the central location. Thus, there is shown a logging sonde 10 which is adapted to move through a borehole 11 drilled into the earth 12. The sonde 10 is supported in the borehole 11 by means of an armored multi-conductor 13 which extends to the surface of the earth and passes over a sheave wheel 14 to a drum and winch mechanism 15. The logging sonde 10 may include vari-"

ous exploring and measuring devices for measuring various electrical, acoustical and radioactive properties of of the subsurface earth formations.

The measurement signals sent to the surface of the earth by way of the individual conductors in the cable 13 are supplied by way of an appropriate brush and slip ring mechanism 16 to a control panel 17. The measurement signals received from the downhole sonde 10 appear at the output of the control panel 17 and are designated as $A_2$ through $A_6$. These are direct-current type analog data signals, each representing a different downhole measurement. These analog data signals are supplied to a multichannel photographic recorder 18 located at the well site. The recording medium or photographic film in the recorder 18 is advanced in synchronism with the movement of the sonde 10 through the borehole 11 by means of a mechanical measuring wheel 19 and associated mechanical linkage 20, the wheel 19 engaging and being rotated by the cable 13 at a location near the drum and winch mechanism 15. The recorder 18 also includes a mechanical odometer-type depth counter 21 which is connected internally to the mechanical linkage 20 to provide a visual indication of the depth of the sonde 10 in the borehole 11.

The usual manner of exploring the borehole 11 is to lower the sonde 10 to the bottom of the hole and then to make the measurements as the sonde 10 is withdrawn from the hole at a fairly constant speed.

The five analog data signals $A_2$–$A_6$ appearing at the output of control panel 17 are also supplied to a commutator 22 which includes five relay-type switches which may be individually opened and closed to connect the analog data signals one at a time in sequence to the input of an analog-to-digital converter 23. The switches within commutator 22 are controlled by gating signals generated by a word gate generator 24 so that only one switch at a time is closed. Word gate generator 24 includes a 6:1 pulse counter together with a matrix circuit for producing on different output lines, designated $W_1$ through $W_6$, individual gating signals corresponding to the different count combinations in the 6:1 counter.

Figure 3:
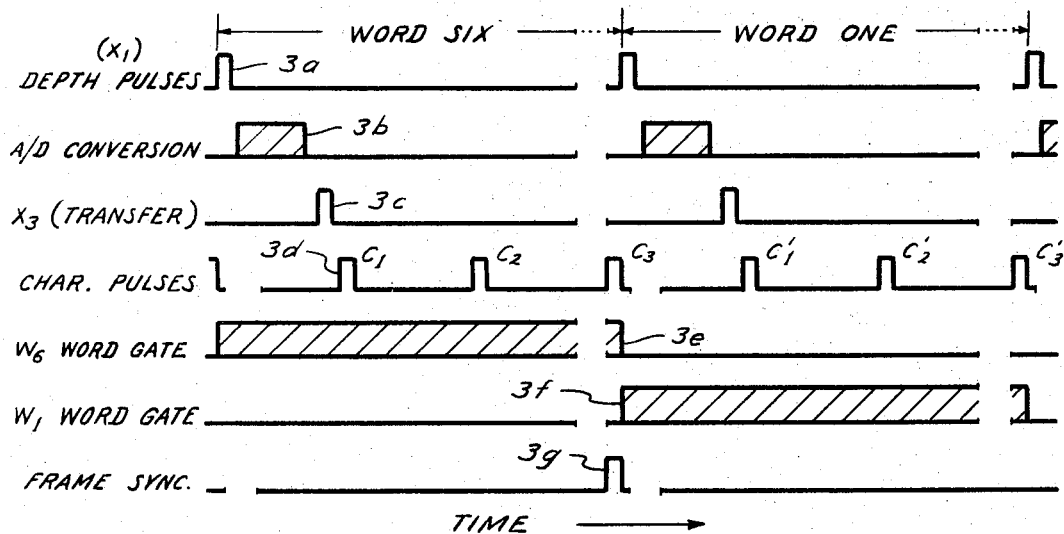
FIG. 3 is a timing diagram showing the signal waveforms at various points in the FIG. 1 portion of the system.

Word gate generator 24 is driven by pulses, designated $X_1$, obtained from a depth pulse generator 25. Depth pulse generator 25 is, in turn, driven by means of a mechanical measuring wheel 26 and associated mechanical linkage 27, the wheel 26 engaging and being rotated by the cable 13. Depth pulse generator 25 produces an output pulse each time the logging sonde 10 moves a vertical distance of one inch in the borehole 11. These $X_1$ depth pulses are represented by waveform 3a in FIG. 3.

Each time a depth pulse is supplied to the word gate generator 24, the counter therein advances one count and a new one of the $W_1$ through $W_6$ output lines is energized. This, in turn, closes a different one of the switches in commutator 22. Thus, a different one of the analog signals $A_2$ through $A_6$ is connected to the input of the analog-to-digital converter 23 every time the sonde 10 moves a distance of one inch along the borehole 11. The gating signals appearing on word gate generator output lines $W_1$ and $W_6$ are represented by waveforms 3f and 3e, respectively, of FIG. 3. This switching operation is cyclic in nature so that after each analog signal has been once switched to the analog-to-digital converter 23, the cycle is repeated so that they are switched a second time, and so on.

Immediately after a switch in the commutator 22 is closed, the analog-to-digital converter 23 is started into operation by means of a pulse, designated $X_2$, produced by passage of the depth pulse $X_1$ through a delay circuit 28. The maximum duration for the analog-to-digital conversion process is indicated by the shaded pulses shown in waveform 3b in FIG. 3. When this conversion process has been completed, there appears at the output of the converter 23 a 12-bit parallel binary coded representation of the analog signal value just converted. This 12-bit binary signal is then transferred in a parallel manner by means of a set of twelve individual transfer gates 29 to the twelve stages of a binary storage register 30. This transfer is caused by a transfer pulse, designated $X_3$, which is produced by the passage of the previous $X_2$ pulse through a delay circuit 31. The $X_3$ transfer pulse is supplied to the transfer line of each of the twelve stages comprising gates 29. The $X_3$ pulse is represented by waveform 3c of FIG. 3.

Figure 2:
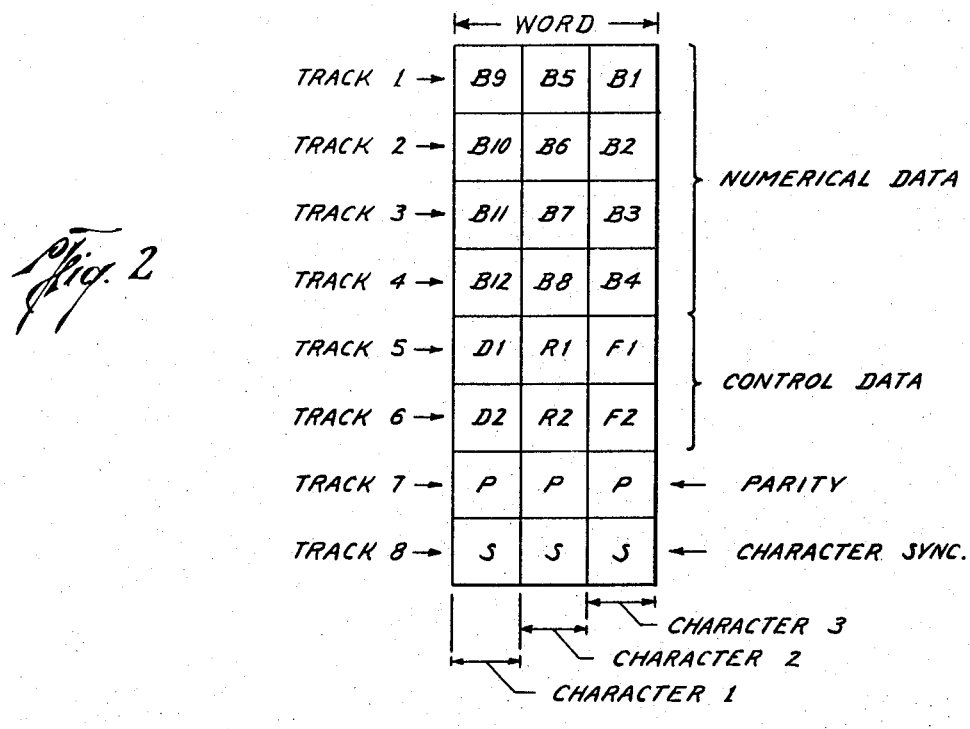
FIG. 2 is a chart describing the signal transmission format for the FIG. 1 system.

In accordance with the particular signal transmission format used by the present embodiment, it is desired to transmit the twelve binary bits in the register 30 in three successive groups of four each. This may be seen by reference to the chart of FIG. 2. As there indicated, the present system is adapted to simultaneously transmit eight parallel tracks or lines of data. The three successive groups into which the data is to be divided are designated as "characters." As indicated by the chart of FIG. 2, it is desired to transmit the four binary bits $B_9$ through $B_{12}$ during the first character, the four binary bits $B_5$ through $B_8$ during the second character, and the four binary bits $B_1$ through $B_4$ during the third character. Each grouping of three characters is called a "word." Each "word" contains one complete 12-bit binary data signal.

The segregation of the twelve binary bits stored in storage register 30 into three successive character groups is performed by three sets of AND gates 32, 33 and 34. Each set includes four individual AND gate circuits. The four outputs of each set of gates 32, 33 and 34 are connected to input lines $T_1$ through $T_4$ of an eight-stage output register 35, the first output of each set being connected to the $T_1$ line, the second to the $T_2$ line, and so forth. The four-stage gates 32, 33 and 34 are activated one at a time in sequence by means of individual character pulses $C_1$, $C_2$ and $C_3$. These character pulses are obtained from $X_4$, $X_5$ and $X_6$ timing pulses produced by the passage of the depth pulse through delay circuits 36, 37 and 38. These timing pulses $X_4$, $X_5$ and $X_6$ are passed by way of a set of three AND gates 40 to produce the $C_1$, $C_2$ and $C_3$ character pulses, one after the other in sequence. Their relative time positions are represented by waveform 3d of FIG. 3. They are supplied to correspondingly designated transfer terminals for the gates 32, 33 and 34.

It is desired to activate the data transfer gates 32, 33 and 34 only during the Word Two through Word Six word intervals and not during the Word One interval. In order to accomplish this, the Word One ($W_1$) output line from word gate generator 24 is connected by way of an inverter circuit 41 to the common transfer input for the gates 40. Inverter 41 inverts the logic polarity so as to continuously activate the gates 40 whenever the Word One output line is not energized with a binary "one" value.

It is desired to transmit during Word One of each transmission cycle a binary-coded decimal representation of the setting of the depth counter 21. To this end, the driving mechanism of the depth counter 21 is coupled by way of mechanical linkage 42 to a depth encoder 44. Depth encoder 44 includes a plurality of ten-position rotary switches which are mechanically synchronized with different ones of the individual number wheels in the depth counter 21. The wiper arm of each rotary switch is connected to a source of direct-current energizing voltage. Each of the rotary switches has a diode matrix connected to the ten fixed contacts thereof so as to provide a binary-coded representation for the number value of its corresponding number wheel in the counter 21. In this manner, there is provided a 4-bit binary representation for the 10's place, a 4-bit binary representation for the 100's place and a 4-bit binary representation for the 1000's place. This type of a depth encoder is described in greater detail in copending application Serial No. 394,174, filed September 3, 1964.

The 10's representation from depth encoder 44 is supplied to a set of four AND gates 45, the 100's representation to a set of four AND gates 46 and the 1000's representation to a set of four AND gates 47. Character transfer pulses for these gates 45, 46 and 47 are obtained, as before, from the $X_4$, $X_5$ and $X_6$ timing pulses but, this time, by way of a set of three AND gates 48. These character pulses are designated by the primed numerals $C_1'$, $C_2'$ and $C_3'$. They are obtained only during the Word One transmission interval by connecting the common transfer pulse input terminal for the gates 48 to the $W_1$ output line from word gate generator 24. Thus, gates 48 and, hence, gates 45, 46 and 47 are operative only during the Word One intervals.

In order to know when the transmission of one complete group of six data words has been finished, it is necessary to provide an end-of-group synchronizing signal. In the present case, each group of six words is designated as a "frame" and the end-of-group pulse is designated as a "frame" sync pulse. Each "frame" corresponds to a complete cycle of data transmission wherein a measurement of each of the six data signals (five earth formation measurements and one depth measurement) is transmitted.

The desired frame sync signals are provided by a pair of two-input AND gates 50 and 51. These gates 50 and 51 are connected to provide at each of their outputs a frame sync pulse during the occurrence of Character Three of Word Six. This is done by connecting each of the gates 50 and 51 to the $C_3$ output line of gates 40 and the $W_6$ output line of word gate generator 24. The outputs of gates 50 and 51 are connected to the Track Five ($T_5$) and Track Six ($T_6$) input lines of the register 35. One of the output frame sync pulses is represented by waveform 3g in FIG. 3. The frame sync position in the transmission format table shown in FIG. 2 is represented by bits $F_1$ and $F_2$.

The various signals supplied to each of the Track One ($T_1$) through Track Six ($T_6$) input lines for register 35 are also supplied to a parity computer 52. Character pulses from an OR circuit 53 are also supplied for timing purposes to the computer 52. Parity computer 52 examines the signals on the $T_1$ through $T_6$ lines and generates, during the occurrence of a character pulse from OR circuit 53, an output pulse if, at that moment, pulses are appearing on either none or an even number of these $T_1$ through $T_6$ lines. (Note: "zero" is an "even" number.) If an odd number of the $T_1$ through $T_6$ lines is being energized with pulses, then no pulse appears at the output of parity computer 52. The output of parity computer 52 is connected to the Track Seven ($T_7$) input line of register 35. As a result of this parity operation, there will always be a pulse on at least one of the seven $T_1$ through $T_7$ input lines. Parity computer 52 may take the form of the parity computer described in copending application Serial No. 394,174, filed on September 3, 1964.

In the present embodiment, it is also desired to transmit what might be termed as "character sync pulses," one of these pulses being transmitted for each character interval. These character sync pulses are provided by means of the OR circuit 53. The six input lines to OR circuit 53 are coupled to the $C_1$–$C_3$ and $C_1^1$–$C_3^1$ output lines of gates 40 and 48. These character sync pulses (represented by waveform 3d) are supplied to the Track Eight ($T_8$) input line for register 35.

The eight-stage output register 35 drives eight sets of tone oscillators 55. Each of the eight stages of the register 35 (one for each of the data track lines) controls a different one of the sets of oscillators 55. In the simplest case, tone oscillators 55 comprise eight individual oscillator circuits, each adapted to oscillate at a different frequency in the audio frequency range. These audio frequencies are spaced 100 cycles apart in, for example, the 1000 to 2000-cycle per second range. Each oscillator is then gated "on" or activated whenever the corresponding track input line stage of the register 35 contains a binary "one" representation.

In a somewhat more complex case, each of the eight sets of tone oscillators 55 may comprise a pair of oscillators, one of which is activated when it is desired to represent a binary "one" value and the other of which is activated when it is desired to represent a binary "zero" value. Each oscillator in a pair would be adapted to oscillate at a neighboring but slightly different frequency in the audio range.

The audio tones appearing at the outputs of the various tone oscillators 55 are added together and supplied to a radio transmitter 56 which then broadcasts them by way of an antenna system 57 to the desired central location. A separate auxiliary voice channel is provided by way of a two-way radio apparatus 58 and associated telephone-type handpiece 59. In this manner, voice communications can be carried on, if necessary, at the same time that the data signals are being transmitted.

In addition to transmission by the radio transmitter 56, the combined audio tones appearing at the output of tone oscillators 55 are simultaneously recorded on magnetic tape by an audio magnetic tape recorder 60. This enables the well logging operation to be continued even though there should be a temporary failure in the radio transmission. In such case, the part of the data that was not transmitted (or received) could be transmitted at a later time by playing back the audio tones recorded by the recorder 60. Playback is accomplished by setting a switch 61 to switch contact 61c and changing the operation of the recorder 60 to the playback mode.

Referring now to FIGURE 4 of the drawings, there is shown a representative embodiment of the central office portion of the well logging telemetry system of the present invention. The FIG. 4 portion of the system is constructed to receive and process the signals transmitted by the FIG. 1 portion of the system.

Considering the details of the FIG. 4 receiving station, the transmitted radio frequency signal is intercepted by an antenna system 65 and supplied to a radio receiver 66. A two-way radio apparatus 68 and telephone-type handpiece 69 is connected to the antenna system 65 to provide the other end of the auxiliary voice channel. The radio frequency carrier onto which the pulse-code audio tones are modulated is amplified and demodulated by the radio receiver 66 to recover the mixture of audio tones representing the coded data. This composite modulation signal is supplied to a set of eight individual tone filters 70 which are individually tuned to a different one of the audio tone frequencies. These filters, which are of the band-pass type, serve to separate the different audio tone (or pairs of tones where pairs of audio oscillators are used). The separated audio tones are then supplied in a parallel manner to a set of eight individual detector circuits 71. Each of the resulting detected signals is individually supplied to a corresponding one of a set of eight pulse generators 72. In response to these signals, the pulse generators 72 produce pulse-type output signals corresponding to the coding of the audio tones. The pulse signal appearing on the Track Eight ($T_8$) output line for the Track Eight pulse generator of pulse generators 72 is represented by waveform 5a of FIG. 5. This signal comprises a series of character synchronizing pulses (binary "one" values), one pulse occurring at the beginning of each character interval in the received signal. The numerical data signal appearing on the Track Three ($T_3$) output line of pulse generators 72 is represented by waveform 5b of FIG. 5. As indicated by the binary "zero" legends, some character intervals do not contain a signal pulse (binary "one" value). This depends upon the binary coding of the signal being received at that instant.

Track output lines $T_1$ through $T_4$, which contain the numerical data, are connected in parallel to each of three sets of AND gates 73, 74 and 75. Each of the gates 73, 74 and 75 includes four individual AND gate circuits arranged in a side-by-side manner. These sets of gates 73, 74 and 75 are adapted to be energized one at a time in sequence by a different one of the locally generated character timing pulses $C_1$, $C_2$ and $C_3$. In this manner, the three sets of four-bit pieces comprising each complete 12-bit data signal is transferred to a different four-stage portion of a 12-stage word register 76. This enables the reconstruction of the original twelve-bit data signal in its original parallel form in the twelve side-by-side stages of the register 76.

The individual $C_1$, $C_2$ and $C_3$ character pulses are reconstructed at the central office receiving station by means of a character pulse generator 77. Generator 77 includes a 3:1 pulse counter a matrix circuit for producing individual output pulses on individual output lines for each of the three count conditions in the counter, together with three individual one-shot multi-vibrators which respond to the matrix circuit output signals to generate the final $C_1$, $C_2$ and $C_3$ output pulses with the desired pulse width. The counting input of the 3:1 counter in the generator 77 is connected to the Track Eight ($T_8$) output line from the pulse generators 72. As a consequence, a count is counted for each character synchronizing pulse on the Track Eight line.

The character pulse generator 77 is synchronized with the incoming telemetry signal so that the proper character pulses are generated during the proper character intervals in the incoming signal by detecting the occurrence of frame sync indications in the incoming signal. This is done by connecting the Track Five ($T_5$) and Track Six ($T_6$) output lines of pulse generators 72 to an AND gate 78. Gate 78 detects the occurrence of the frame sync pattern during the third character interval of the last or 6th word of each transmission cycle to produce an output frame sync pulse. This output frame sync pulse is represented by waveform 5f in FIG. 5. It is supplied to the reset terminal of the character pulse generator 77. It resets the generator 77 to the Character 3 condition.

The $C_1$, $C_2$ and $C_3$ character pulses from generator 77 are supplied to the correspondingly designated transfer pulse terminals of the gates 73, 74 and 75. The relative time positions of these character pulses is indicated in waveform 5c. (They are, however, on separate lines.) Thus, they activate the gates 73, 74 and 75 one after the other in sequence during the appropriate character intervals in the received signal.

Each of the twelve parallel output lines from the word register 76 is connected in parallel to the input of each of six different twelve-stage storage registers 81–86. This is indicated by the heavy width line running between these units, the heavy width representing a bundle containing twelve individual parallel conductors. Since the six data words appear one after the other in sequence in the word register 76, it is necessary to connect the storage registers 81–86 one at a time in sequence to the output of the word register 76. This is done by supplying individual word gate signals to the different storage registers 81–86 to activate their input circuits during the appropriate word intervals.

The word gate signals are generated by supplying each $C_3$ character pulse from the generator 77 by way of a first delay circuit 87 and a second delay circuit 88 to the counting input of a word gate generator 90. Word gate generator 90 includes a 6:1 pulse counter and a matrix circuit for developing individual output signals on individual output lines corresponding to each of the different count conditions in the 6:1 counter. These six individual output lines are connected to a series of six AND gate circuits 91–96. The operation in the present system is such that the parallel binary signal in word register 76 is transferred to the appropriate one of the storage registers 81–86 and then the word gate generator 90 is set to the count condition for the next word to be received. This particular manner of operation is provided by the time delay circuits 87 and 88.

Assume, for example, that Word Six binary indications are at the moment stored in the word register 76 and that the word gate generator 90 is in the Word Six condition (output gate signal being supplied to gate 96). The $C_3$ character pulse which transferred the last four bits of this Word Six data into the register 76 is also supplied to the delay circuit 87 to produce at the output thereof a delayed timing pulse $X_1$ (waveform 5d of FIG. 5). This delayed pulse $X_1$ is supplied to each of the gate circuits 91–96 and since, at this moment, only the Word Six ($W_6$) gate 96 is in an operative condition, the $X_1$ pulse causes the gate 96 to operate to produce an output transfer pulse for Word Six. This transfer pulse from gate 96 is supplied to the input circuits of the Word Six storage register 86. This produces a storage in the register 86 of the twelve binary bit values contained at that moment in the word register 76.

Shortly thereafter there appears at the output of the second delay circuit 88 a second delayed timing pulse, designated $X_2$, which is supplied to the counting input of word gate generator 90. This $X_2$ pulse is represented by waveform 5e. It serves to set the word gate generator 90 to the next word count condition which, in this example, is the Word One condition. At the same time, the $X_2$ pulse is also supplied to the reset lines for the twelve stages in the word register 76 so as to reset the word register 76 to a zero condition. The receiving system is then in condition to process the next following data word which, in this case, is Word One.

Synchronization of the word gate generator 90 is obtained by supplying the frame sync pulse appearing at the output of gate circuit 78 to the reset terminal of the generator 90. This frame sync pulse, appearing during Character Three of Word Six resets the word gate generator 90 to the Word Six condition. As a consequence, the $X_2$ pulse appearing shortly thereafter (see waveforms of FIG. 5) will advance the generator 90 to the Word One condition as desired.

As is seen from the foregoing, the received binary coded data values for the Word One interval are processed and stored in the output storage register 81, the binary data values for Word Two are stored in the output storage register 82, the binary data values for Word Three are stored in the output storage register 83, and so on through Word Six, the values for Word Six being stored in the output register 86. Since the Word One data is a numerical representation of the depth of the logging sonde 10 in the borehole, the data in storage register 81 is used to drive a depth display 101 to provide a visual indication of this depth reading. Depth display 101 may take the form of known decimal read-out devices comprising banks of decimal indicator lamps which are energized to indicate decimal values.

The binary values stored in the remainder of the storage registers 82–86 are supplied to individual binary-to-analog converter circuits 102–106 which, in each case, develop an analog output signal corresponding to the value stored in the corresponding one of registers 82–86. These resulting analog output signals $A_2$ through $A_6$ correspond to the original analog input signals at the well site transmitting station. These analog signals $A_2$–$A_6$ are supplied to the individual recording galvanometers of a multi-channel photographic recorder 108. They are recorded on the photographic film material constituting the record chart as such film material is advanced in synchronism with the movement of the logging sonde 10 through the earth borehole at the well site.

This desired advancement or driving of the photographic film is obtained in the present embodiment by supplying the individual $C_1$, $C_2$ and $C_3$ character timing pulses from the generator 77 to a three-input OR circuit 109. This combines the individual pulses to provide a single pulse train as represented in waveform 5c. This sync pulse wave train is supplied to motor drive circuits 110 which, in turn, energize an electric motor 111 which, in turn, drives the spooling mechanism for the photographic film material in recorder 108. This is done by way of a mechanical linkage 112.

The advancement of the film material or recording medium in recorder 108 is performed in an incremental or step-by-step fashion, the film material being advanced one increment for each character sync pulse supplied to the motor drive circuits 110. Motor 111 may be a so-called "stepping" motor. Instead, it may be a more conventional type of motor activated by motor drive circuits which supply periodic pulses of driving current thereto.

The photographic recorder 108 includes a mechanical odometer-type depth counter 113 which is advanced in step with the photographic film material in the recorder 108. In this regard, the photographic recorder 108 and depth counter 113 are identical to the photographic recorder 18 and depth counter 21 located at the well site and shown in FIG. 1. In both cases, they are the conventional photographic recorders used in well logging.

The central office receiving station of FIG. 4 also includes means for checking the received telemetry signal to determine whether there is any appreciable transmission errors therein. This means includes a parity computer 120 which is connected to receive the signals from track output lines $T_1$ through $T_6$ of pulse generation 72. Character timing pulses from OR circuit 109 are applied by way of input terminal S for timing purposes. Computer 120 then operates in a manner similar to parity computer 52 at the well site transmitter to produce an output signal if an even number of the $T_1$ through $T_6$ lines contain binary "one" indications. In other words, the computer 120 operates on the received data signals on the $T_1$–$T_6$ lines to compute a parity signal for such received signals. This computed or "recomputed" parity signal is then compared with the transmitted parity signal appearing on the Track Seven line by means of a comparing circuit 121. If there is a lack of agreement, then an error signal is supplied to an alarm circuit 122 which then momentarily energizes a loudspeaker 123 to produce an audible audio beep.

An occasional audio beep from loudspeaker 123 indicates occasional errors. Such occasional errors can be generally tolerated and do not greatly disturb the log produced by the recorder 108. If the audio beeps from loudspeaker 123 should become too frequent, then corrective measures can be taken by communicating with the well site transmitting station by way of the auxiliary voice channel associated with telephone handsets 69 and 59 and two-way radios 68 and 58. If necessary, a defective portion of the transmitted signal can be repeated at a later time by playing back the audio tape in the tape recorder 60 at the transmitting station.

The alarm circuit 122 includes a gated audio oscillator circuit which is activated and disabled by the control voltage from the comparing circuit 121, such audio oscillator driving an appropriate amplifier circuit which, in turn, is connected to the loudspeaker 123. Comparing circuit 121 includes suitable logic circuitry, such as an AND circuit and an inverter circuit, for producing a high level output signal only when the two input signals are not in agreement.

In addition to the conventional form of well log produced by the photographic recorder 108, there may be included at the central office receiving station a digital magnetic tape recorder 130 for producing a digitally recorded magnetic tape which may be used to drive a general purpose electronic computer. The digital magnetic tape recorder 130 is of the multi-track type having multiple recording heads for recording on multiple tracks on the tape (in the present example, seven tracks). The signals for the recording heads are obtained from the $T_1$ through $T_7$ track output lines from pulse generators 72. If necessary, timing signals for the recorder 130 may be obtained from the Track Eight output line of pulse generators 72.

As previously mentioned, the customary procedure in well logging is to lower the logging sonde 10 to the bottom of the borehole 11. The well logging measurements are then performed as the sonde 10 is withdrawn from the borehole 11 by moving it in an upwardly direction. Before the measurements are commenced and with the sonde 10 at the bottom of the hole, voice communications may be established by way of the auxiliary voice channel to advise the personel at the central office receiving station of the depth of the logging sonde 10 when at the bottom of the hole. The central office personnel may then set the mechanical depth counter 113 associated with the photographic recorder 108 to this bottom hole depth value. In all likelihood, the depth counter 113 will subsequently remain in step with the movement of the logging sonde 10 through the borehole. This may be periodically checked by the central office personnel, however, by comparing the reading of the depth counter 113 with the depth reading provided by the depth display 101. If there are any discrepancies, the mechanical depth counter 113 should be readjusted to agree with the depth indicated by the depth display 101.

In the foregoing embodiment, a separate depth synchronizing signal was transmitted by means of the Track Eight audio tone. This separate synchronizing signal may be omitted, however, and the depth synchronization obtained directly from the Track One through Track Seven data signals, provided the proper form of parity signal is utilized. A proper form of parity signal is that described above, where a parity indication is transmitted whenever zero or an even number of binary "one" values is transmitted by way of the first six audio tone. In such case, there will always be a binary "one" indication, either in the parity track or in at least one of the other data tracks, for each character interval.

In order to take advantage of this to provide the depth synchronization, it is only necessary to connect the Track One through Track Seven output lines from the pulse generators 72 to a seven-input OR circuit. In such case, a depth synchronizing character pulse is produced at the output of such OR circuit for each character interval. The train of character pulses derived in this manner may then be used to drive the motor drive circuits 110 and the counting input of the character pulse generator 77 of FIG. 4. In this case, only seven audio tones need be utilized.

As is seen from the foregoing descriptions of the transmitting and receiving apparatus, the well logging telemetry system of the present invention enables a well log to be recorded by the photographic recorder 108 at the central office location simultaneously with the movement of the logging sonde 10 through the borehole 11 at the remote well site location. As a result, the geophysicist and the management personnel at the central office location may examine the results of the well logging measurements and transmit the appropriate instructions and decisions to the well site personnel relatively rapidly and with a minimum of loss of time.

If a general purpose electronic computer is available to the central office personnel, then the digital magnetic tape from recorder 130 can be processed by such computer and highly accurate computations made available to the central office personnel in short order, which computations or the decisions resulting therefrom can be immediately communicated to the remote well site personnel.

In some cases, where the radio transmitting apparatus at the well site may be temporarily unavailable or out of operation, the well logging measurements can, nevertheless, be recorded on the audio magnetic tape recorder 60 at the well site. In this case, the recorded audio tape can be played back by the tape recorder 60 and transmitted to the central office location as soon as the radio transmitter equipment becomes available. Again, there is a minimum loss of time in making the well log available to the central office personnel and relaying the appropriate decisions back to the well site personnel. This particular manner of tape recording is discussed in greater detail in applicant's copending application "Magnetic Tape Recording Methods and Apparatus for Well Logging," Ser. No. 505,283, filed on Oct 26, 1965.

It is not intended that the present invention should be limited to the case of transmission by means of radio waves or other "wireless" waves because the invention is equally applicable to the case of transmission by means of telephone lines, telegraph lines, or other physical transmission lines. In the latter cases, the radio transmitter at the well site and the radio receiver at the central location need only be replaced by suitable terminal equipment for applying and removing the combined audio tones to and from the transmission line.

While there have been described what are at the present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A well logging system for making well logging measurements in a borehole drilled into the earth at a remote well site location and producing a record of these measurements at a central location located a considerable distance from the well site location comprising: logging means adapted for movement through the earth borehole for measuring subsurface phenomena and providing measurement signals indicative thereof; means responsive to longitudinal movement of the logging means through the borehole for producing depth signals indicative of such movement; means responsive to both the measurement signals and the depth signals for producing pulse type coded signals having characteristics indicative of both the measurement and depth signals; means for transmitting the pulse type coded signals to the central location; recorder means located at the central location for recording signals on a recording medium; means located at the central location and responsive to the transmitted pulse type coded signals for supplying to the recorder means for recording on the recording medium, signals indicative of the measurement signal characteristics of the pulse type coded signals; and means responsive to the depth signal characteristics of the pulse type coded signals for advancing the recording medium of the recorder means as a function of the movement of the logging means through the borehole.

2. A well logging system for making well logging measurements in a borehole drilled into the earth at a remote well site location and producing a record of these measurements at a central location located a considerable distance from the well site location comprising: logging means adapted for movement through the earth borehole for measuring subsurface phenomena and providing measurement signals indicative thereof; means responsive to longitudinal movement of the logging means through the borehole for producing depth signals indicative of such movement; encoder means responsive to the measurement signals for producing coded signals indicative thereof; means located at the remote well site and responsive to the depth signals for controlling the encoder means for producing these coded signals in increments determined by the occurrence of the depth signals; means for transmitting signals including at least the coded signals to the central location; recorder means located at the central location for recording signals on a recording medium; decoder means located at the central location and responsive to the transmitted coded signals for supplying to the recorder means for recording on the recording medium signals indicative of the original measurement signals; and means located at the central location and responsive to the transmitted signals for advancing the recording medium of the recorder means in step with the coded signal increments.

3. A well logging system for making well logging measurements in a borehole drilled into the earth at a remote well site location and producing a record of these measurements at a central location located a considerable distance from the well site location comprising: logging means adapted for movement through the earth borehole for measuring subsurface phenomena and providing measurement signals indicative thereof; means responsive to longitudinal movement of the logging means through the borehole for producing depth signals indicative of such movement; means responsive to the measurement signals for producing data signals indicative thereof; means responsive to the depth signals for producing pulse type synchronizing signals indicative thereof; means for transmitting both the data signals and the synchronizing signals to the central location; recorder means located at the central location for recording signals on a recording medium; means located at the central location and responsive to the transmitted data signals for supplying to the recorder means for recording on the recording medium signals indicative of the original measurement signals; and means responsive to the pulse type synchronizing signals for advancing the recording medium of the recorder means as a function of the movement of the logging means through the borehole.

4. In a well logging system for making well logging measurements in a borehole drilled into the earth at a remote well site location and producing a record of these measurements at a central location located a considerable distance from the well site location, transmitting apparatus located at the well site comprising: logging means adapted for movement through the earth borehole for measuring subsurface phenomena and providing measurement signals indicative thereof; means responsive to longitudinal movement of the logging means through the borehole for producing depth signals indicative of such movement; means responsive to both the measurement signals and the depth signals for producing coded signals having characteristics indicative of both the measurement and depth signals; and means for transmitting the coded signals to the central location, including means for generating a carrier wave and means for modulating the carrier wave with representations of the coded signals.

5. In a well logging system for making well logging measurements by moving an exploring instrument through a borehole drilled into the earth at a remote well site location and producing a record of these measurements at a central location located a considerable distance from the well site location by transmitting thereto pulse type coded signals having characteristics indicative of both the logging measurements and the movement of the instrument through the borehole, receiving apparatus located at the central location comprising: recorder means for recording signals on a recording medium; means responsive to the logging measurement characteristics of the received pulse type coded signals for supplying to the recorder means for recording on the recording medium signals indicative of the original logging measurements; and means responsive to the instrument movement characteristics of the received pulse type coded signals for advancing the recording medium of the recorder means as a function of the movement of the exploring instrument through the borehole.

6. In a well logging system for making well logging measurements in a borehole drilled into the earth at a remote well site location and producing a record of these measurements at a central location located a considerable distance from the well site location, the combination comprising: logging means adapted for movement through the earth borehole for measuring subsurface phenomena; means responsive to longitudinal movement of the logging means through the borehole for producing pulse type signals in increments indicative of increments of such movement; means for transmitting the pulse type incremental signals to the central location; recorder means located at the central location for recording indications of the subsurface phenomena on a recording medium; and means responsive to the received pulse type incremental signals for advancing the recording medium of the recorder means in increments corresponding to the movement of the logging means through the borehole.

7. In a well logging telemetry system wherein well logging data signals are transmitted as periodic groups of binary coded signals and wherein each group also includes a signal representing the parity condition of the other signals in the group, receiving apparatus for indicating transmission errors in the transmitted signals as received at a receiving location comprising: means responsive to the data signal components of the received well logging signals for computing the parity condition of these components and producing output signals representative thereof; means responsive to both the computed parity signals and to the parity components in the received signals for producing alarm signals whenever these signals are not in agreement; and means responsive to the alarm signals for producing audible alarm signals.

8. The apparatus of claim 1 wherein the pulse type coded signals are a plurality of relatively low frequency sinusoidal signals, having a plurality of frequencies, controlled by digital signals having a plurality of bit positions, the presence of pulse type signals in the respective bit positions causing a signal having a particular frequency to be generated; and wherein the means for transmitting the pulse type coded signals includes means for modulating a carrier wave with the generated relatively low frequency signals; and the means responsive to the transmitted pulse type coded signals at the central location includes means for filtering out the various modulation frequencies to reproduce the bits of the digital signals.

9. The apparatus of claim 8 wherein the digital signals have weighted bit positions representative of the measurement signals and at least one bit position representing a depth synchronization pulse for advancing the recording medium of the recorder means at the central location in synchronism with the movement of the logging means through the borehole.

10. The apparatus of claim 8 wherein at least one of the bit positions of the digital signals represents a parity bit derived from substantially all of the other bit positions of the digital signals; and further including means located at the central location for computing the parity condition of the received digital signals and indicating the presence of errors in the received digital signals.

11. The apparatus of claim 2 wherein the logging means includes a plurality of means for producing separate measurement signals corresponding to separate measurement apparatus, and wherein the encoder means includes commutator means for responding to the signals from each one of the separate measurement apparatus on a time sharing basis for enabling the transmission of the signals from the plurality of measurement apparatus; and wherein the decoder means at the central location includes decommutator means for separating the signals from the different measuring apparatus on a time sharing basis.

References Cited
UNITED STATES PATENTS

| | | | |
|---|---|---|---|
| 2,156,052 | 4/1939 | Cooper | 340—18 |
| 2,233,992 | 3/1941 | Wyckoff | 340—18 X |
| 2,651,027 | 9/1953 | Vogel | 340—18 |
| 2,968,724 | 1/1961 | Clark. | |
| 3,207,256 | 9/1965 | Blizard | 340—18 X |
| 3,277,440 | 10/1966 | Gouilloud et al. | 340—18 |
| 3,134,957 | 5/1964 | Foote et al. | 340—15.5 |
| 3,257,639 | 6/1966 | Kokesh | 340—18 |
| 3,309,521 | 3/1967 | Bargainer | 340—18 X |

FOREIGN PATENTS

| | | |
|---|---|---|
| 704,864 | 3/1965 | Canada. |

BENJAMIN A. BORCHELT, *Primary Examiner.*

R. M. SKOLNIK, *Assistant Examiner.*